(12) United States Patent
Mitchell

(10) Patent No.: US 8,771,434 B2
(45) Date of Patent: Jul. 8, 2014

(54) ARTIFICIAL TURF REMOVER AND INFILL SEPARATOR, AND METHOD OF USE THEREOF

(76) Inventor: Mark Mitchell, Rocky Face, GA (US)

( * ) Notice: Subject to any disclaimer, the term of this patent is extended or adjusted under 35 U.S.C. 154(b) by 946 days.

(21) Appl. No.: 12/832,301

(22) Filed: Jul. 8, 2010

(65) Prior Publication Data

US 2012/0006930 A1 Jan. 12, 2012

(51) Int. Cl.
*B21B 45/02* (2006.01)

(52) U.S. Cl.
USPC ........................................... 134/122 R

(58) Field of Classification Search
USPC .......... 134/104.2, 122 R, 124, 125, 131, 133, 134/137, 151, 165, 198, 199, 201
See application file for complete search history.

(56) References Cited

U.S. PATENT DOCUMENTS

| | | | |
|---|---|---|---|
| 2,998,081 A | | 8/1961 | Hartmangruber et al. |
| 4,002,491 A | * | 1/1977 | Esparza ............................. 134/6 |
| 4,084,763 A | | 4/1978 | Zamboni |
| 4,278,133 A | * | 7/1981 | de Marcellus .................. 172/14 |
| 4,957,404 A | * | 9/1990 | Lepley ........................... 414/324 |
| 5,007,325 A | * | 4/1991 | MacWatt ........................ 89/1.13 |
| 5,638,879 A | * | 6/1997 | Robison et al. ............. 144/208.7 |
| 6,881,001 B1 | | 4/2005 | McCamy |
| 2003/0037388 A1 | | 2/2003 | Feyma et al. |
| 2009/0183323 A1 | | 7/2009 | Davis |
| 2010/0001115 A1 | * | 1/2010 | Jonsson ......................... 242/566 |
| 2010/0037419 A1 | | 2/2010 | de Bree |
| 2010/0319510 A1 | * | 12/2010 | Bearden .......................... 83/155 |

FOREIGN PATENT DOCUMENTS

| | | | | |
|---|---|---|---|---|
| DE | 8218929 | | 12/1982 | |
| DE | 9409749 | | 11/1994 | |
| EP | 0185646 | A2 | 6/1986 | |
| GB | 2174584 | A * | 11/1986 | ............. A01B 45/04 |
| JP | 61-146278 | A | 7/1986 | |
| JP | 1214558 | A | 8/1989 | |
| JP | 11293618 | | 10/1999 | |
| JP | 2000-008314 | A | 1/2000 | |
| NL | 1032985 | | 6/2008 | |
| WO | WO 8301722 | A * | 5/1983 | |
| WO | 2006046863 | | 5/2006 | |

* cited by examiner

*Primary Examiner* — David Cormier
(74) *Attorney, Agent, or Firm* — Mathew L. Grell; Balser & Grell IP Law

(57) ABSTRACT

An artificial turf remover and infill separator comprising an artificial turf removing station, an infill separating station and an artificial turf collection station. The infill separating station comprises rotatable spinning devices comprises corners, wherein each corner comprises chain links. The artificial turf remover and infill separator is utilized by positioning a strip of artificial turf on an angular ramp, conveying the artificial turf over a first pair of rotatable rollers, conveying the artificial turf between a second pair of rotatable rollers, separating infill from the artificial turf via fin-shaped picks, square-shaped rotatable diggers and the rotatable spinning devices, wherein the chain links jostle the infill material from the artificial turf onto a first and second infill collection conveyor belt. The artificial turf is then conveyed over a first and second base roller, between a rear pair of counter-rotating rollers and then wound around a final artificial turf collection roller.

13 Claims, 7 Drawing Sheets

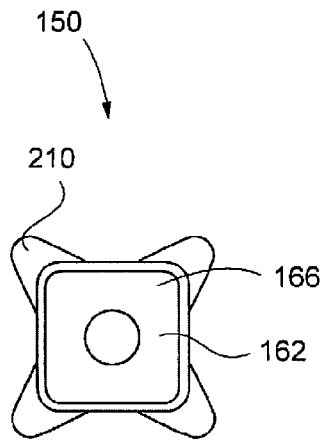
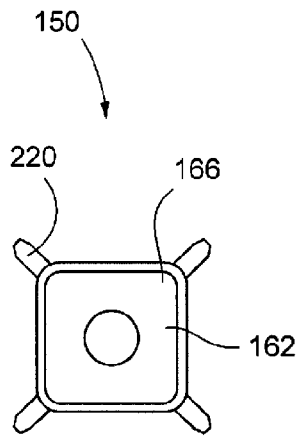
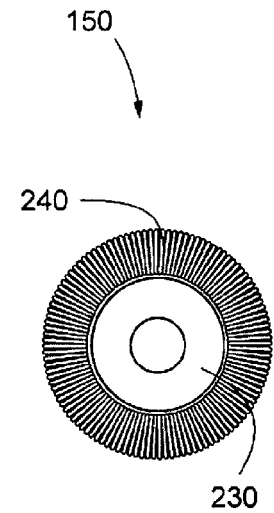
FIG. 7   FIG. 8   FIG. 9
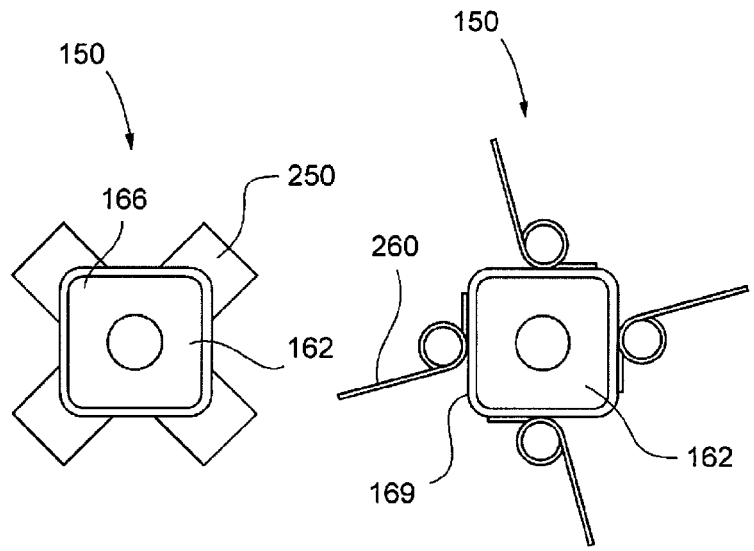
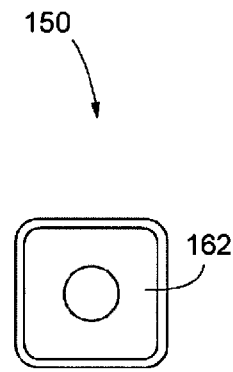
FIG. 10   FIG. 11   FIG. 12

ARTIFICIAL TURF REMOVER AND INFILL SEPARATOR, AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The preferred embodiment relates generally to an artificial turf remover and infill separator, and method of use thereof, and more specifically to an artificial turf remover and infill separator comprising an artificial turf removing station, an infill separating station and an artificial turf collecting station. The infill separating station comprises fin-shaped picks and rotatable diggers that remove infill from the face of the artificial turf as it is turned upside down. Additionally, the infill separating station comprises rotatable spinning devices having chain links secured thereto, that whip against collected artificial turf to jostle loose the infill material.

2. Description of Related Art

Artificial turf is commonly utilized on football fields, baseball fields, golf courses and the like. Unlike natural grass, one benefit of artificial turf is that it does not require watering in the summer months, nor does it freeze in the winter months. Additionally, artificial turf is advantageous because it does not require mowing, fertilizing and/or airing.

Typically, artificial turf comprises a mat of polymeric filaments and an infill material. The infill material may comprise, for exemplary purposes only, combinations of sand, crushed rubber and/or plastic granules. To install the artificial turf, several mats are rolled out onto a field and glued or sewed together, and subsequently the infill material is evenly distributed on top of the mat, penetrating down between the filaments.

While artificial turf is advantageous in many respects, it needs to be replaced with new artificial turf approximately every eight to ten years. The reasons for replacing artificial turf may be because the artificial turf is worn out, or because the artificial turf has been installed inappropriately, for example, base drainage is poor.

Currently there exist several devices and methods for removing and/or replacing artificial turf. One device teaches lifting a strip of turf from a ground base and directing the turf through a separating and winding section by means of powered guide rollers. The separating section separates infill material from the turf, and the winding station rolls the turf around a central shaft into a compact, transportable form. The device comprises at least one rotatable grinder structure. In one embodiment, the grinder structure consists of a square section with a round bar welded to each corner. During the separating process, the square-shaped grinder rotates via drive means as the artificial turf is directed past it, with the grinder being arranged in such a position that the rounded bars on each corner contact the turf in a cyclic manner. However, while such a device utilizes grinder structures with rounded bars to remove infill material, it does not invert the turf to remove infill material, and thus does not efficiently remove all the infill material.

Another previous device teaches a method for loosening artificial turf infill. The device comprises a rotating drum with multiple fin-shaped prongs extending therefrom. The machine is either pushed or pulled along artificial turf, such that the elongated prongs extend into the artificial turf to dislodge any infill material within. While such a device is useful in removing infill from artificial turf, it utilizes only fin-shaped prongs to dislodge the infill material and does not turn the turf upside down to remove the infill material, and thus does not efficiently remove all the infill material.

Yet another machine teaches a process of turf removal by which artificial turf is withdrawn along a path from a floor surface having artificial turf onto a driven take-up roll. Before being rolled, the artificial turf is directed through a separating section which dislodges dirt from the turf. The dislodging mechanism involves a rotating drum provided with extended beater bars that engage the turf to comb dirt therefrom and forcing it to fall onto a collection area. However, while such a device utilizes beater bars to remove infill material, it does not invert the turf to comb infill from the artificial turf, and thus does not efficiently remove all the infill material.

Therefore, it is readily apparent that there is a need for an artificial turf remover and infill separator that utilizes a variety of methods that penetrate the face and flail the back side of collected artificial turf, thereby efficiently removing infill from the collected artificial turf.

BRIEF SUMMARY OF THE INVENTION

Briefly described, in a preferred embodiment, the present invention overcomes the above-mentioned disadvantages and meets the recognized need for such an apparatus by providing an artificial turf remover and infill separator comprising an artificial turf removing station, an infill separating station and an artificial turf collection station. The infill separating station comprises fin-shaped picks and rotatable diggers that remove infill from the face of the artificial turf as it is turned upside down. The infill separating station further comprises rotatable spinning devices. Each of the rotatable spinning devices comprises chain links disposed on each of the corners of the rotatable spinning devices, which are utilized to strike against the back of the artificial turf, thereby generating a force to dislodge infill material from the artificial turf.

According to its major aspects and broadly stated, the present invention in its preferred form is an artificial turf remover and infill separator comprising an artificial turf removing station, an infill separating station and an artificial turf collection station. The artificial turf removing station, the infill separating station and the artificial turf collection station are disposed on a base frame, which comprises wheels, a front side, a first base roller and a second base roller. The artificial turf remover and infill separator further comprises a collapsible front frame. The collapsible front frame pivots away from the front side of the base frame via hinges and comprises a front bar. The front bar of the collapsible front frame is dimensioned to be received by a towing vehicle, thereby allowing the artificial turf remover and infill separator to be movable along a longitudinal strip of artificial turf by pulling the base frame.

The artificial turf removing station comprises an angular ramp having a front end and a rear end. The front end of the angular ramp contacts a strip of artificial turf on a ground surface. The rear end of the angular ramp is disposed proximate the infill separating station. As the artificial turf remover and infill separator is pulled along a longitudinal strip of artificial turf, the front end of the angular ramp lifts the artificial turf from the ground surface and guides the artificial turf up the angular ramp and toward the infill separating station.

The infill separating station comprises a first pair of rotatable rollers, fin-shaped picks and a second pair of rotatable rollers. As the artificial turf remover and infill separator is transported along a longitudinal strip of artificial turf, the artificial turf is guided up the angular ramp and then over the first pair of rotatable rollers via rotation of the first pair of rotatable rollers. The artificial turf is then guided between the second pair of rotatable rollers via rotation of the second pair of rotatable rollers. After the artificial turf travels between the between pair of rotatable rollers, the artificial turf is inverted, such that the fin-shaped picks penetrate a face side of the artificial turf, thereby loosening and dislodging the infill material from the artificial turf.

The infill separating section further comprises rotatable diggers and rotatable spinning devices. Each of the rotatable diggers comprises a square section having corners, and each of the corners comprises rounded bars at the end thereof. Similarly, each of the rotatable spinning devices comprises corners having chain links. As the artificial turf is turned upside down after passing between the second set of rotatable rollers, the rounded bars of the rotatable diggers penetrate the face of the artificial turf in a cyclic manner, thereby loosening and dislodging the infill material in the artificial turf, such that the infill material falls onto a first infill collection conveyor belt. Additionally, the chain links of the spinning devices contact a back side of the artificial turf in a cyclic manner, thereby jostling infill material out of the artificial turf and onto the first infill collection conveyor belt. It will be recognized by those skilled in the art that rotatable diggers may dislodge infill material utilizing other shaped devices, such as, for exemplary purposes only rectangular shaped diggers, circular shaped diggers, and the like.

The first infill collection conveyor belt comprises a first end and a second end. The infill material removed from the artificial turf via the rotatable diggers and the rotatable spinning devices falls onto the first infill collection conveyor belt via gravitational force, and the infill material is subsequently conveyed from the first end to the second end of the first infill collection conveyor belt. The second end of the first infill collection conveyor belt is disposed proximate a second infill collection conveyor belt, wherein the second infill collection conveyor belt conveys the infill material to a final infill collection drop section.

Subsequently, the artificial turf is further conveyed between the first pair of rotatable rollers and around the first base roller on the base frame via rotation of the first base roller. The artificial turf is then conveyed around the second base roller on the base frame via rotation of the second base roller until the artificial turf reaches the artificial turf collection station.

The artificial turf collection station comprises a rear pair of counter-rotating rollers and a final artificial turf collection roller. The artificial turf is then conveyed between the rear pair of counter-rotating rollers from the second base roller via rotation of the rear pair of counter-rotating rollers. The artificial turf is subsequently conveyed around the final artificial turf collection roller via rotation of the final artificial turf collection roller, such that the artificial turf is rolled into a cylindrical shape.

The preferred embodiment further comprises a method of removing artificial turf and collecting infill material comprising the step of obtaining an artificial turf remover and infill separator comprising an angular ramp, a first pair of rotatable rollers, a second pair of rotatable rollers, fin-shaped picks, rotatable grinders, rotatable spinning devices, a first infill collection conveyor belt, a second infill collection conveyor belt, a first base roller, a second base roller, a rear pair of counter-rotating rollers and a final artificial turf collection roller. The method further comprises the steps of lifting a strip of artificial turf from a ground surface, positioning the strip of artificial turf on the angular ramp, conveying the artificial turf over the first pair of rotatable rollers and conveying the artificial turf between the second pair of rotatable rollers, thereby turning the artificial turf upside down as the artificial turf contacts the fin-shaped picks and the rotatable diggers.

The method further comprises the steps of separating infill material from the artificial turf via the fin-shaped picks, separating the infill material from the artificial turf via the square-shaped rotatable diggers and separating the infill material from the artificial turf via the rotatable spinning devices comprising chain links, thereby jostling the infill material onto the first infill collection conveyor belt and then the to second infill conveyor belt.

The method further comprises the steps of conveying the artificial turf around the first base roller, conveying the artificial turf around the second base roller, conveying the artificial turf between the rear pair of counter-rotating rollers and winding the artificial turf around the final artificial turf collection roller, wherein the artificial turf is collected into a cylindrical shape.

More specifically, the present invention is an artificial turf remover and infill separator comprising an artificial turf removing station, an infill separating station and an artificial turf collection station. The artificial turf removing station, the infill separating station and the artificial turf collection station are disposed on a base frame. The base frame is disposed on wheels and comprises a front side, first base roller and a second base roller. A collapsible front frame pivots away from the front side of the base frame via hinges. The collapsible front frame comprises a front bar, which is dimensioned to be received by a towing vehicle to move the artificial turf remover and infill separator on the wheels. It will be recognized by those skilled in the art that the artificial turf remover and infill separator may be moved self propelled.

The artificial turf removing station comprises an angular ramp. The angular ramp comprises a front end and a rear end. The angular ramp attaches to the base frame via a support bar. When in use, the rear end of the angular ramp slides up the support bar until the front end of the angular ramp contacts a ground surface and the rear end of the angular ramp is disposed proximate the infill separating station. The infill separating station comprises a first pair of rotatable rollers, a second pair of rotatable rollers, a first infill collection conveyor belt, fin-shaped picks, rotatable grinders, spinning devices and a second infill collection conveyor belt. The first infill collection conveyor belt comprises a first edge and a second edge. The second infill collection conveyor belt is disposed proximate the second edge of the first infill collection conveyor belt. The second infill collection conveyor belt conveys infill removed from artificial turf to a final infill collection drop section.

In particular, the spinning devices of the infill separating station comprise rotatable square-shaped spinners and chain links. The chain links are disposed on each of the corners of the rotatable square-shaped spinners. The chain links are utilized to whip the artificial turf and jostle loose infill material.

After the artificial turf is conveyed through the infill separating section, the artificial turf is guided through the artificial turf collection station. The artificial turf collection station comprises a rear pair of counter-rotating rollers and a final artificial turf collection roller. The final artificial turf collection roller is disposed above and between the rear pair of counter-rotating rollers.

In use, the collapsible front frame pivots away from the base frame via hinges and the front bar of the collapsible front frame secures to a towing vehicle. Subsequently, the rear end of the angular ramp slides upward along the support bar until the front end of the angular ramp is positioned on a ground surface and the rear end of the angular ramp is disposed proximate the infill separating station. A strip of artificial turf is positioned on the rear end of the angular ramp. As the towing vehicle pulls the artificial turf remover and infill separator, the artificial turf is guided up the angular ramp toward the infill separating station. The artificial turf is then guided over the first pair of rotatable rollers via rotation of the first pair of rotatable rollers. The artificial turf is subsequently guided in between the second pair of rotatable rollers as the second pair of rotatable rollers rotate, thereby turning the artificial turf upside down as it passes over the fin-shaped picks and rotatable diggers. A face side of the artificial turf then contacts the fin-shaped picks, thereby efficiently loosening infill material from the artificial turf. Subsequently, as the first pair of rotatable rollers and the second pair of rotatable rollers continue to rotate, the face of the inverted artificial turf is conveyed over the rotatable diggers. The rotatable diggers comprise corners having fin-shaped bars. The fin-shaped bars contact the face side of the inverted artificial turf in a cyclical manner to remove the infill material from the artificial turf. The infill material removed from the artificial turf by the rotatable diggers then falls onto the first infill collection conveyor belt via gravitational force. Subsequently, a back side of the artificial turf is whipped by the chain links on the spinning devices. The chain links further jostle loose any infill material, which also falls onto the first infill collection conveyor belt via gravitational force. The infill material collected on the first infill collection conveyor belt is then conveyed onto the second infill collection conveyor belt and then to the final infill collection drop section.

The artificial turf is then conveyed between the first pair of rotatable rollers and around the first base roller on the base frame via rotation of the first pair of rotatable rollers and rotation of the first base roller. The artificial turf is subsequently guided around the second base roller on the base frame via rotation of the second base roller. Lastly, the artificial turf is conveyed toward the artificial turf collection station, wherein the artificial turf is guided between the rear pair of counter-rotating rollers via rotation of rear pair of counter-rotating rollers, and then is wound around the final artificial turf collection roller via rotation of final artificial turf collection roller into a cylindrical shape for later re-use.

In an alternate embodiment, the infill separating station of the artificial turf remover and infill separator comprises multiple rotatable diggers. The multiple rotatable diggers are spaced apart, thereby providing further assistance in removing infill that is particularly hard to remove from the face of the artificial turf.

In another alternate embodiment, the rotatable diggers comprise rotatable square-shaped spinners, wherein fin-shaped picks are disposed on each of the corners of the rotatable square-shaped spinners.

In another alternate embodiment, the rotatable diggers comprise rotatable square-shaped spinner, wherein rods are disposed on each of the corners of the rotatable square-shaped spinners.

In yet another alternate embodiment, the rotatable diggers comprise rotatable cylinders having bristles disposed around the periphery thereof.

In another alternate embodiment, the rotatable diggers comprise rotatable square-shaped spinners, wherein rectangular bars are disposed on each of the corners of the rotatable square-shaped spinners.

In yet another alternate embodiment, the spinning rotatable diggers comprise rotatable square-shaped spinners, wherein pins are disposed on each of the sides of the rotatable square-shaped spinners.

In another alternate embodiment, the rotatable diggers comprise only rotatable square-shaped spinners.

Accordingly, a feature and advantage of the present invention is its ability to efficiently remove artificial turf from a ground surface.

Another feature and advantage of the present invention is its ability to separate infill material from the artificial turf.

Still another feature and advantage of the present invention is its ability to roll the collected artificial turf into a cylindrical shape for storage, transportation and later re-use.

Another feature and advantage of the present invention is its ability to utilize a variety of infill separating means, including fin-shaped picks that efficiently comb infill from the face of the artificial turf, as the artificial turf is upside down.

Still another feature and advantage of the present invention is its ability to utilize rotatable grinders that dig out infill material from the face of the artificial turf, as the artificial turf is upside down.

Yet another feature and advantage of the present invention is its ability to efficiently jostle loose any infill material via spinning devices with chains attached thereto.

Still yet another feature and advantage of the present invention is its ability to be either towed or self propelled.

Another feature and advantage of the present invention is its ability to accommodate any type of artificial turf under the influence of any particular weather conditions.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred Embodiment with reference to the accompanying drawing figures, in which like reference numerals denote similar structure and refer to like elements throughout, and in which:

FIG. 7 is an end view of a rotatable digger component of an artificial turf remover and infill separator according to an alternate embodiment;

FIG. 8 is an end view of a rotatable digger component of an artificial turf remover and infill separator according to an alternate embodiment;

FIG. 9 is an end view of a rotatable digger component of an artificial turf remover and infill separator according to an alternate embodiment;

FIG. 10 is an end view of a rotatable digger component of an artificial turf remover and infill separator according to an alternate embodiment;

FIG. 11 is an end view of a rotatable digger component of an artificial turf remover and infill separator according to an alternate embodiment; and FIG. 12 is an end view of a rotatable digger component of an artificial turf remover and infill separator according to an alternate embodiment.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-12, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
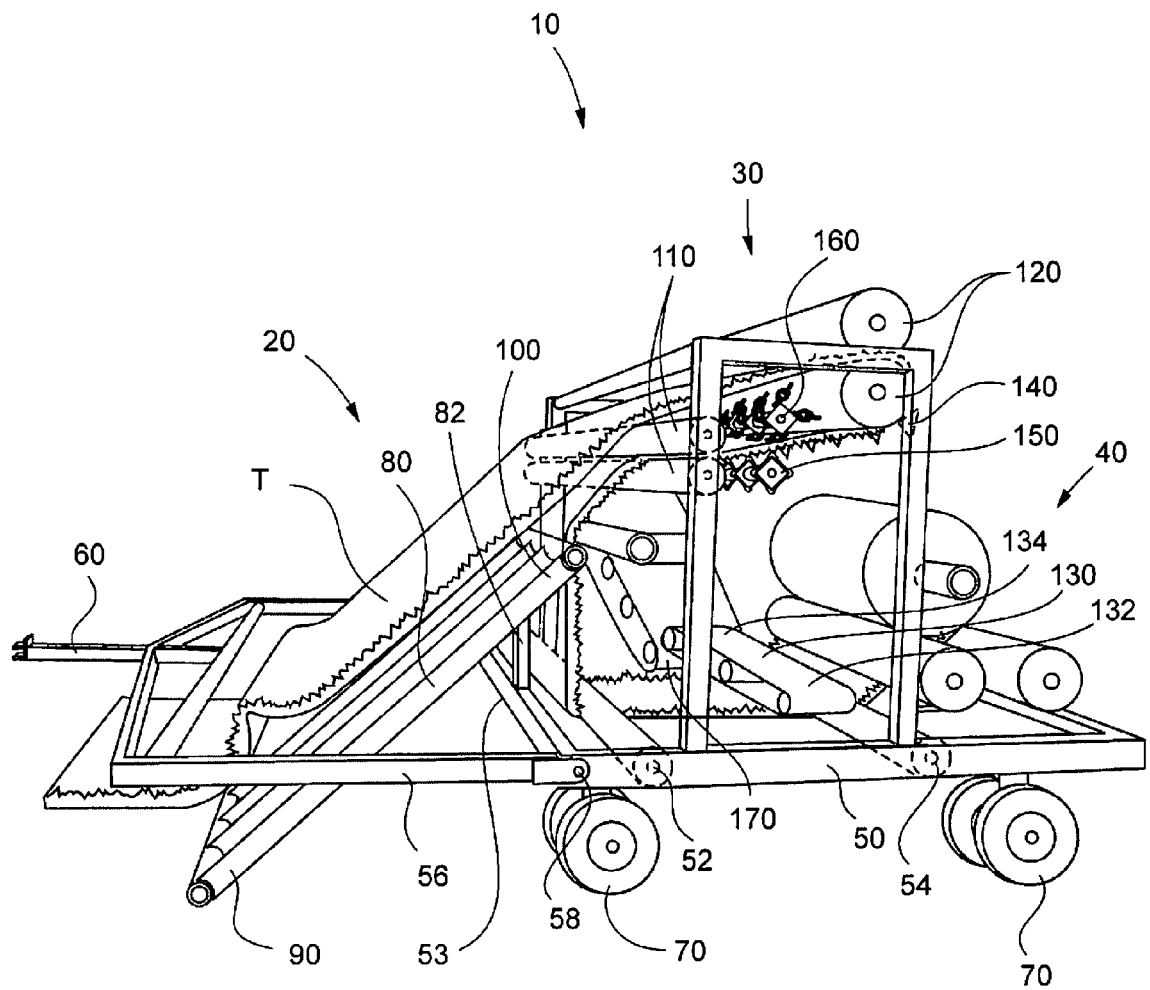
FIG. 1 is a side perspective view of an artificial turf remover and infill separator according to a preferred embodiment.

Referring now to FIG. 1, artificial turf remover and infill separator 10 comprises artificial turf removing station 20, infill separating station 30 and artificial turf collection station 40, wherein artificial turf removing station 20, infill separating station 30 and artificial turf collection station 40 are disposed on base frame 50, and wherein base frame 50 comprises first base roller 52, front edge 53, second base roller 54 and wheels 70. Collapsible front frame 56 is hingably secured to front edge 53 of base frame 50, wherein collapsible front frame 56 comprises front towing bar 60. When in use, collapsible front frame 56 pivots toward or away from infill separating station 30 via hinges 58, wherein front towing bar 60 of collapsible front frame 56 is dimensioned to be received by a towing vehicle to move artificial turf remover and infill separator 10 on wheels 70. It will be recognized by those skilled in the art that artificial turf remover and infill separator 10 can be moved via a towing vehicle, or alternatively, may be self propelled.

Still referring to FIG. 1, artificial turf removing station 20 comprises angular ramp 80, wherein angular ramp 80 comprises front end 90 and rear end 100. Angular ramp 80 is slidably and pivotably secured to base frame 50 via upright support bar 82. When in use, rear end 100 of angular ramp 80 slides up upright support bar 82 until front end 90 contacts a ground surface and rear end 100 is disposed proximate infill separating station 30.

Infill separating station 30 comprises first pair of rotatable rollers 110, second pair of rotatable rollers 120, first infill collection conveyor belt 130, fin-shaped picks 140, rotatable diggers 150 and spinning devices 160, wherein first infill collection conveyor belt 130 comprises first edge 132 and second edge 134.

Figure 2:
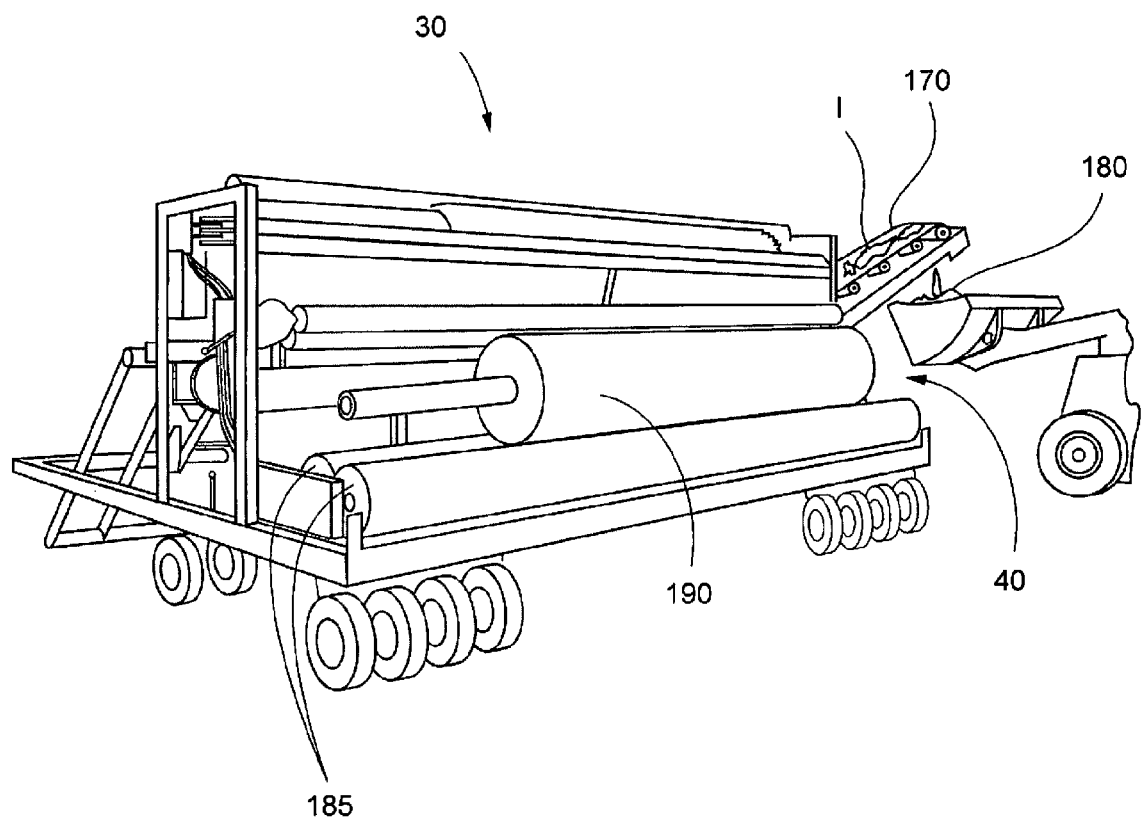
FIG. 2 is a rear perspective view of an artificial turf remover and infill separator according to a preferred embodiment.

Referring now to FIGS. 1-2, infill separating station 30 further comprises second infill collection conveyor belt 170, wherein second infill collection conveyor belt 170 is disposed proximate second edge 134 of first collection conveyor belt 130, and wherein second infill collection conveyor belt 170 conveys infill I to final infill collection drop section 180. Artificial turf is lastly conveyed to artificial turf collection station 40, wherein artificial turf collection station 40 comprises rear pair of counter-rotating rotatable rollers 185 and final artificial turf collection roller 190, and wherein final artificial turf collection roller 190 is disposed above and between rear pair of counter-rotating rollers 185.

Figure 3:
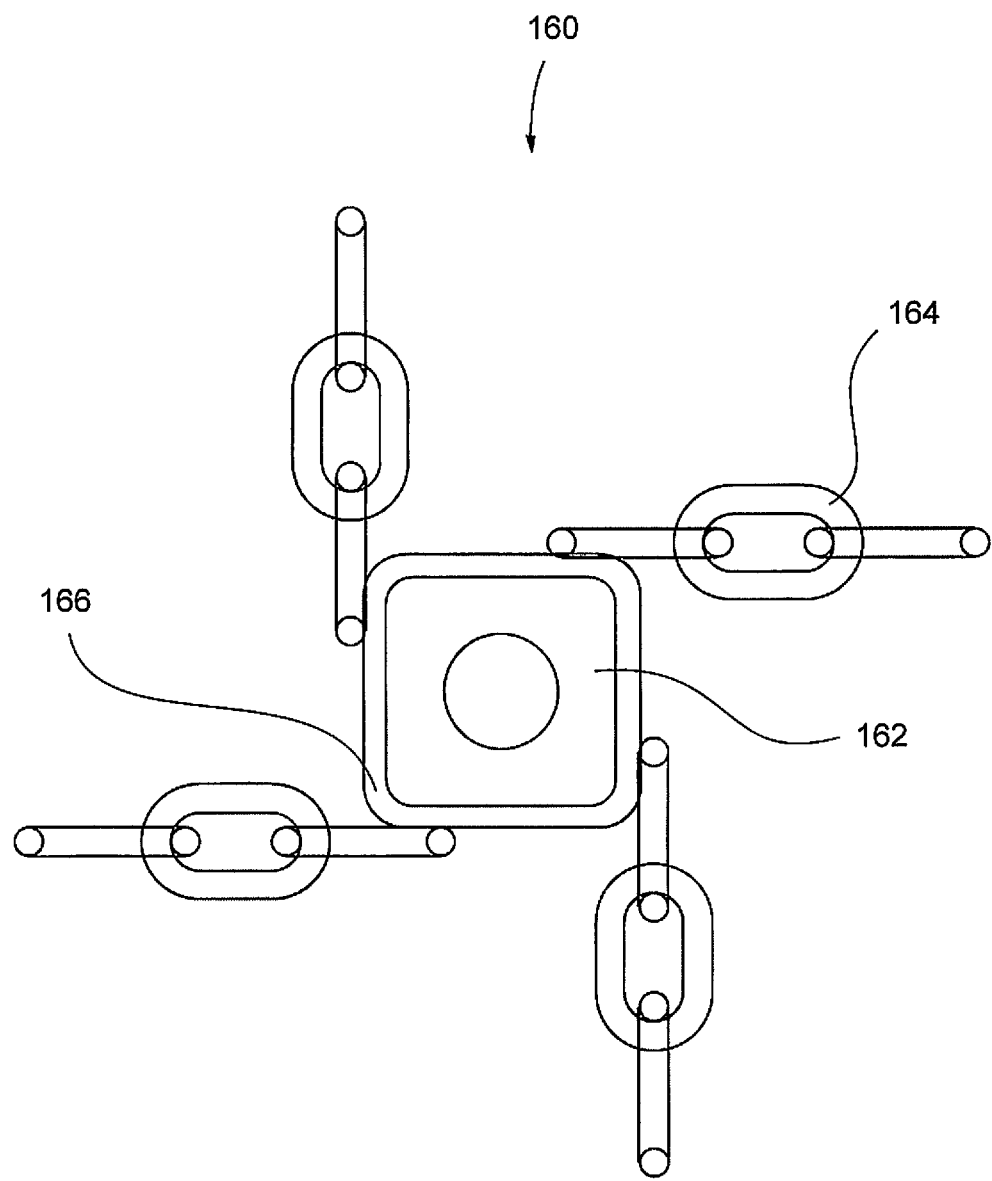
FIG. 3 is an end view of a spinning device component of an artificial turf remover and infill separator according to a preferred embodiment.

Referring now to FIG. 3, spinning devices 160 comprise rotatable square-shaped spinners 162 and chain links 164, wherein chain links 164 are disposed on corners 166 of rotatable square-shaped spinners 162, and wherein chain links 166 contact artificial turf T (best shown in FIG. 4) whipping artificial turf T to jostle loose infill I.

Figure 4:
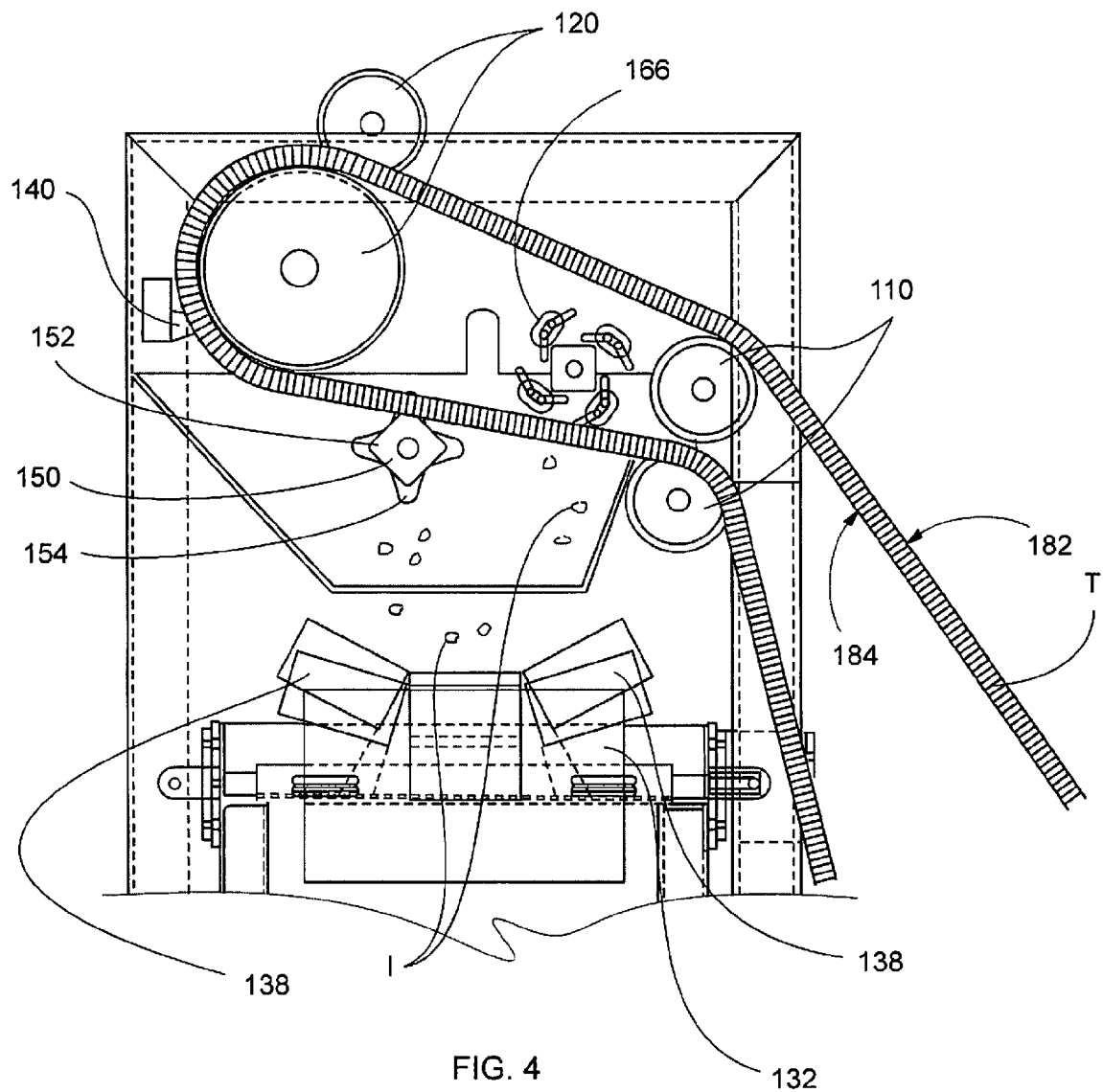
FIG. 4 is a side cross-sectional view of an infill separating station of an artificial turf remover and infill separator according to a preferred embodiment.

Referring now to FIGS. 1-4, in use, collapsible front frame 56 pivots toward or away from infill separating station 30 via hinges 58, wherein front bar 60 of collapsible front frame 56 secures to a towing vehicle. Subsequently, rear end 100 of angular ramp 80 slides upward along upright support bar 82 until front end 90 of angular ramp 80 is positioned on a ground surface, and rear end 100 is disposed proximate infill separating station 30. A strip of artificial turf T is positioned on front end 90 of angular ramp 80, wherein as the towing vehicle pulls artificial turf remover and infill separator 10, artificial turf T is guided up angular ramp 80 toward infill separating station 30. As best shown in FIG. 4, artificial turf T comprising face 182 and back side 184 is guided over first pair of rotatable rollers 110 as first pair of rotatable rollers 110 rotate. Artificial turf T is subsequently guided between second pair of rotatable rollers 120 as second pair of rotatable rollers 120 rotate, wherein artificial turf T is turned upside down as artificial turf T is guided between second pair of rotatable rollers 120, and wherein face 182 of artificial turf T contacts fin-shaped picks 140, thereby loosening infill I from artificial turf T. Subsequently, face 182 of the upside down artificial turf T is conveyed over rotatable diggers 150, wherein rotatable diggers 150 comprise corners 152, and wherein corners 152 comprise fin-shaped bars 154, and wherein fin-shaped bars 154 contact artificial turf T in a cyclical manner as rotatable diggers 150 rotate to remove infill I from artificial turf T as the artificial turf T is in the upside down position. Infill I removed from artificial turf T by rotatable diggers 150 falls onto first infill collection conveyor belt 130 via gravitational force, wherein first infill collection conveyor belt 130 may further comprise side plates 138, and wherein side plates 138 guides infill I onto first infill collection conveyor belt 130. Subsequently, back side 184 of artificial turf T is whipped by chain links 166 of spinning devices 160, wherein chain links 166 further jostle loose any infill I, and wherein infill I falls onto first infill collection conveyor belt 130 via gravitational force, and wherein infill I collected on first infill collection conveyor belt 130 is conveyed onto second infill collection conveyor belt 170 to final infill collection drop section 180, and wherein infill I collected in final infill collection drop section 180 may be re-utilized.

Figure 5:
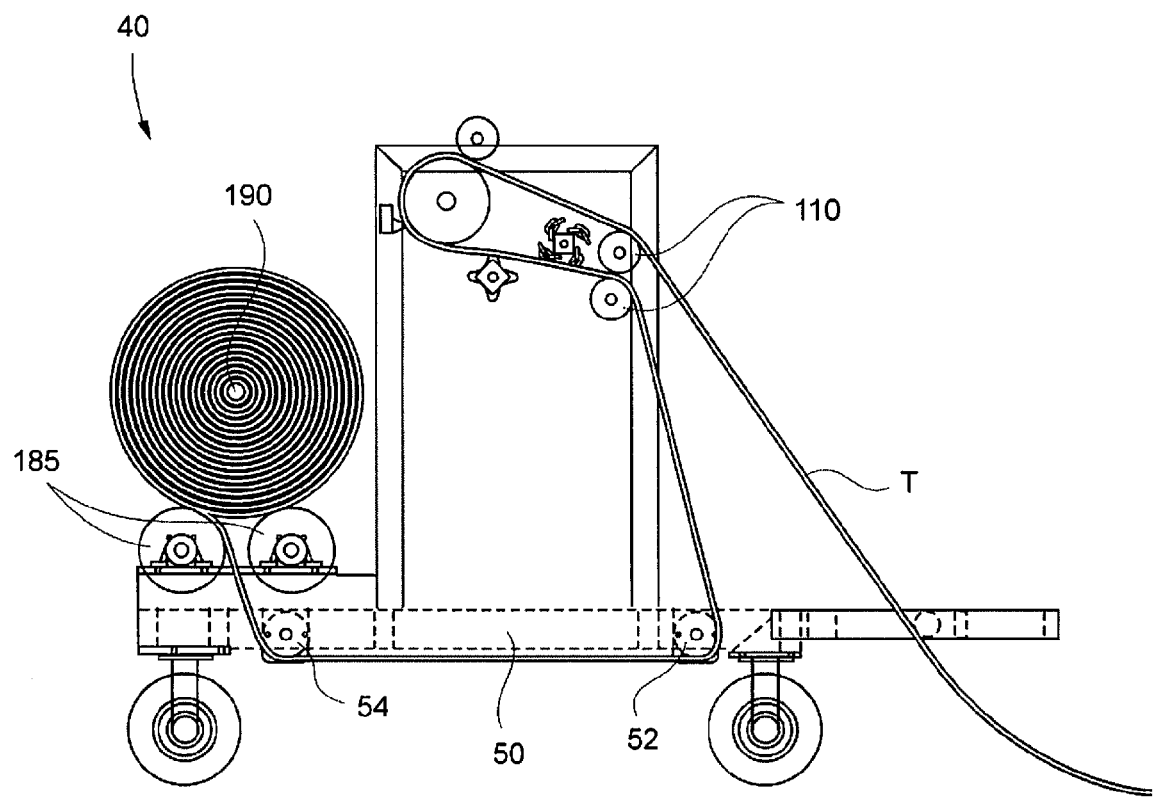
FIG. 5 is side cross-sectional view of an artificial turf remover and infill separator according to a preferred embodiment.

Referring now to FIG. 5, artificial turf T is subsequently conveyed between first pair of rotatable rollers 110 via rotation of first pair or rotatable rollers 110. Artificial turf T is then guided away from first pair of rotatable rollers 110 and around first base roller 52 on base frame 50 via rotation of first base roller 52. Artificial turf T is subsequently guided around second base roller 54 on base frame 50 toward artificial turf collection station 40 via rotation of second base roller 54. Artificial turf T is then conveyed in between rear pair of counter-rotating rollers 185 via rotation of rear pair of counter-rotating rollers 185. Lastly, artificial turf T is wound around final artificial turf collection roller 190 via rotation of final artificial turf collection roller 190, wherein artificial turf T is collected and rolled into a cylindrical shape for later re-use.

Figure 6:
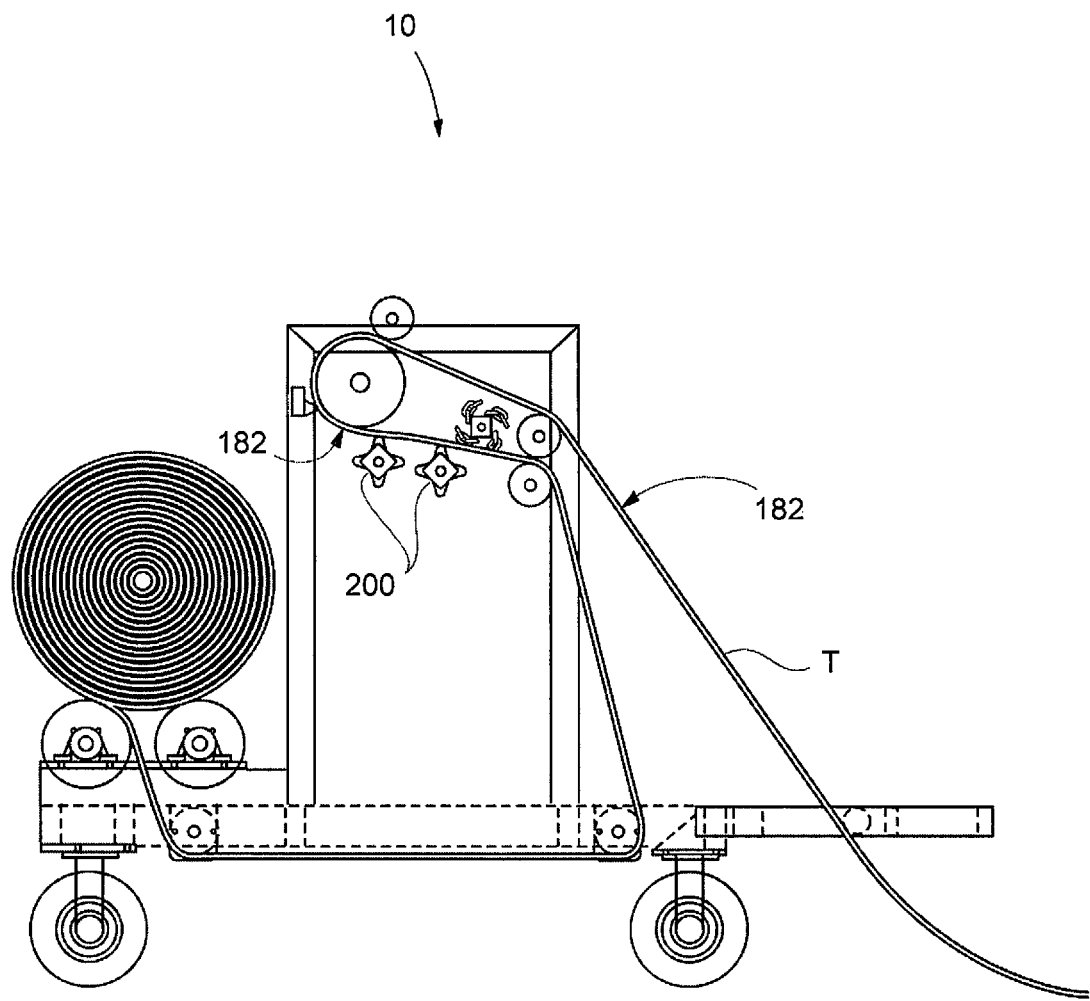
FIG. 6 is side cross-sectional view of an artificial turf remover and infill separator according to an alternate embodiment.

Referring now more specifically to FIG. 6, illustrated therein is an alternate embodiment of artificial turf remover and infill separator 10, wherein the alternate embodiment of FIG. 6 is substantially equivalent in form and function to that of the preferred embodiment detailed and illustrated in FIGS. 1-5 except as hereinafter specifically referenced. Specifically, the embodiment of FIG. 6 comprises multiple rotatable diggers 200, wherein multiple rotatable diggers 200 are spaced apart, and wherein multiple rotatable diggers 200 contact face 182 of artificial turf T as artificial turf T is turned upside down, thereby providing further assistance in removing infill from artificial turf T that is particularly hard to remove.

Referring now more specifically to FIGS. 7-12, illustrated therein are alternate embodiments of rotatable diggers 150, wherein the alternate embodiments of FIGS. 7-12 are substantially equivalent in form and function to that of the preferred embodiment detailed and illustrated in FIGS. 1 and 3 except as hereinafter specifically referenced. Specifically, in the embodiment of FIG. 7, rotatable diggers 150 comprise rotatable square-shaped spinners 162 comprising corners 166, wherein fin-shaped picks 210 are disposed on each corner 166. As shown in FIG. 8, in another alternate embodiment, rotatable diggers 150 comprise rotatable square-shaped spinners 162 comprising corners 166, wherein rods 220 are disposed on each corner 166. As shown in FIG. 9, in yet another alternate embodiment, spinning diggers 150 comprise, for exemplary purposes only, rotatable cylinders 230, wherein bristles 240 are disposed around the periphery of cylinder 230. As depicted in FIG. 10, in yet another alternate embodiment, rotatable diggers 150 comprise rotatable square-shaped spinners 162 comprising corners 166, wherein rectangular bars 250 are disposed on each corner 166. As depicted in FIG. 11, in another alternate embodiment, rotatable diggers 150 comprise rotatable square-shaped spinners 162 comprising sides 169, wherein spring pins 260 are disposed on sides 169. As shown in FIG. 12, in yet another alternate embodiment, rotatable diggers 150 comprise rotatable square-shaped spinners 162.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. An artificial turf remover and infill separator comprising:
   an artificial turf removing station comprises an angular ramp, and wherein said angular ramp comprises a front end and a rear end;
   an infill separating station comprising:
      rotatable spinning devices, wherein each of said rotatable spinning devices comprises corners, and wherein each of said corners comprises chain links;
      a first infill collection conveyor belt comprising a first end and a second end, wherein infill material removed from artificial turf falls onto said first infill collection conveyor belt via gravitational force, and wherein said infill is conveyed from said first end to said second end of said first infill collection conveyor belt;
      a first pair of rotatable rollers, wherein rotation of said first pair of rotatable rollers guides said artificial turf over said first pair of rotatable rollers away from said angular ramp;
      fin-shaped picks; and
      a second pair of rotatable rollers, wherein rotation of said second pair of rotatable rollers guides said artificial turf between said second pair of rotatable rollers and over said fin-shaped picks, and wherein said fin-shaped picks contact a face of said artificial turf, thereby loosening said infill material from said artificial turf; and
   an artificial turf collection station.

2. The artificial turf remover and infill separator of claim 1, wherein said front end of said angular ramp guides said artificial turf from a ground surface toward said rear end of said angular ramp, and wherein said rear end of said angular ramp is disposed proximate said infill separating station.

3. The artificial turf remover and infill separator of claim 1, wherein said face of said artificial turf is further guided over rotatable diggers, and wherein each of said rotatable diggers comprise square shapes having rounded bars disposed on each corner.

4. The artificial turf remover and infill separator of claim 3, wherein said rounded bars of said rotatable diggers further contact said face of said artificial turf in a cyclic manner, thereby loosening said infill material from said artificial turf and onto said first infill collection conveyor belt.

5. The artificial turf remover and infill separator of claim 4, wherein said chain links of said spinning devices contact a bottom side of said artificial turf in a cyclic manner, thereby jostling said infill material from said artificial turf and onto said first infill collection conveyor belt.

6. The artificial turf remover and infill separator of claim 5, wherein said second end of said first infill collection conveyor belt is disposed proximate a second infill collection conveyor belt.

7. The artificial turf remover and infill separator of claim 6, wherein said infill material collected on said first infill collection conveyor belt is conveyed from said second end of said first infill collection conveyor belt onto said second infill collection conveyor belt, and wherein said second infill collection conveyor belt conveys said infill material to a final infill collection section.

8. The artificial turf remover and infill separator of claim 7, wherein said artificial turf removing station, said infill separating station and said artificial turf collection station are disposed on a base frame, wherein said base frame is disposed on wheels, thereby allowing said artificial turf remover and infill separator to be movable.

9. The artificial turf remover and infill separator of claim 8, wherein said base frame comprises a front, a first base roller, a second base roller, and wherein a collapsible front frame is disposed on said front of said base, and wherein rotation of said first base roller guides the artificial turf from said first pair of rotatable rollers around said first base roller, and wherein said collapsible front frame pivots away from said base frame via hinges, and wherein said collapsible front frame comprises a front bar, and wherein said front bar is dimensioned to be received by a towing vehicle.

10. The artificial turf remover and infill separator of claim 9, wherein rotation of said second base roller guides said artificial turf around said second base roller from said first base roller.

11. The artificial turf remover and infill separator of claim 10, wherein said artificial turf collection station comprises a rear pair of counter-rotating rollers and a final artificial turf collection roller.

12. The artificial turf remover and infill separator of claim 11, wherein rotation of said rear pair of counter-rotating rollers guides said artificial turf between said rear pair of counter-rotating rollers away from said second base roller.

13. The artificial turf remover and infill separator of claim 12, wherein rotation of said final artificial turf collection roller winds said artificial turf around said final artificial collection roller into a cylindrical shape from said second base roller.

\* \* \* \* \*